Patented Mar. 11, 1941

2,234,311

UNITED STATES PATENT OFFICE

2,234,311

ESTERS OF HYDROXYSTILBENES AND PROCESS OF PREPARING SAME

Karl Miescher, Riehen, and Jules Heer, Basel, Switzerland, assignors, by mesne assignments, to Ciba Pharmaceutical Products, Incorporated, Summit, N. J., a corporation of New Jersey No Drawing. Application September 12, 1939, Serial No. 294,562. In Switzerland September 16, 1938

13 Claims. (Cl. 260—457)

This invention relates to the manufacture of new esters by causing a dihydroxy-compound of the stilbene series to react with an inorganic esterifying agent and if desired converting the ester thus obtained into a salt.

The parent materials may be any dihydroxy-compounds of the stilbene series. There are especially named: $\alpha,\alpha$-dialkyl-, -dialkenyl-, -dialkinyl-, -alkyl-aryl or diaryl-4,4'-dihydroxy-stilbene such as $\alpha,\alpha'$-dimethyl-4,4'-dihydroxystilbene, $\alpha,\alpha'$-diethyl-4,4'-dihydroxystilbene, $\alpha$-methyl-$\alpha'$-ethyl-4,4'-dihydroxystilbene, $\alpha,\alpha'$-diisopropyl-4,4'-dihydroxystilbene, $\alpha,\alpha'$-diethinyl-4,4'-dihydroxystilbene, $\alpha,\alpha'$-diphenyl-4,4'-dihydroxystilbene or $\alpha$-ethyl-$\alpha'$-n-propyl-4,4'-dihydroxystilbene. These compounds can be produced, for example, according to the particulars given in the letter of E. C. Dodds, L. Golberg, W. Lawson and R. Robinson to the Editor of "Nature" (Nature, February 5, 1938, vol. 141, page 248).

Suitable esterifying agents are for example inorganic acids, their halides, anhydrides or esters, for instance, phosphorus-hydroxy chloride, phosphorus-pentachloride, phosphorus-pentoxide, meta-phosphoric acid, chlorosulfonic acid, toluene-sulfonic acid. Known methods of esterification may be used and condensation agents, for instance pyridine, quinoline or the like. However the method can also be that of Schotten-Baumann.

For producing monoesters the diesters may be partially saponified. These monoesters can however be obtained by partial esterification. Also mixed diesters may be made by methods in themselves known. Esters obtainable by the invention which still contain acid groups may be converted into salts if desired. In this manner salts which are sparingly soluble in water, as well as salts that are freely soluble may be obtained. The soluble salts have a special importance in therapeutics since aqueous solutions of these salts may be injected. For making the salt an inorganic or an organic agent may be used which is capable of forming a salt with an acid, for instance the hydroxide and the carbonates of the alkalis, alkaline earth metals and ammonium, also amines, for instance diethylamine, ethylenediamine, piperidine or the like.

The new esters have an effect in the test for oestrus growth and uterus growth. They find application in therapeutics.

The following examples illustrate the invention:

Example 1

A solution of 1 part of $\alpha,\alpha'$-diethyl-4,4'-dihydroxystilbene in 5 parts of pyridine is added drop by drop to the strongly cooled solution of 2 parts of phosphorus-hydroxy chloride in 5 parts of pyridine. The mixture soon solidifies to a crystalline magma. It is allowed to stand in ice for ¼ hour and then for an hour at room temperature. The mass is then poured into an excess of saturated sodium bicarbonate solution. Unconsumed parent material is removed by extraction with ether. The aqueous solution is then mixed with 2 N-hydrochloric acid, whereupon the primary phosphoric acid ester of $\alpha,\alpha'$-diethyl-4,4'-dihydroxystilbene of the formula

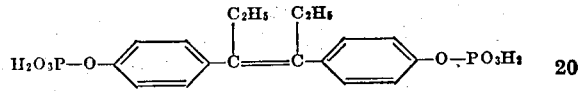

is precipitated in the form of a voluminous white powder. By recrystallization or reprecipitation this ester may be further purified.

1 part of the ester is dissolved in 20 parts of water and the solution is mixed with one of 3 parts of calcium acetate in 10 parts of water. The calcium salt of the $\alpha,\alpha'$-diethyl-4,4'-dihydroxystilbene phosphoric acid ester is thus precipitated in the form of a white powder.

4.28 parts of the above described primary phosphoric acid ester are dissolved in 20 parts of water and the solution is mixed with 0.8 part of sodium hydroxide dissolved in 5 parts of water. The whole is evaporated in a vacuum to dryness. The residue is the water-soluble sodium salt of the aforesaid primary phosphoric acid ester. By recrystallization it may be further purified.

In an analogous manner the secondary and tertiary phosphoric acid esters are obtainable.

Example 2

A solution of 1 part of $\alpha$-methyl-$\alpha'$-ethyl-4,4'-dihydroxystilbene in 10 parts of dry quinoline is added by drops to a strongly cooled solution of 2 parts of chloro-sulfonic acid in 5 parts of quinoline. The mixture soon solidifies to a crystalline magma. It is allowed to stand for a short time in ice and then for 2 hours at room temperature. It is then poured into an excess of sodium bicarbonate solution. Unconsumed parent material and quinoline are removed by extraction with ether. The aqueous solution is mixed with 2 N-hydrochloric acid, whereby the acid sulfuric acid ester of α-methyl-α'-ethyl-4,4'-dihydroxystilbene of the formula

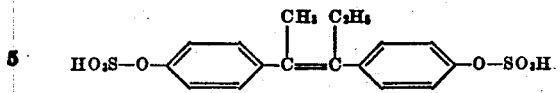

is precipitated in the form of a voluminous white powder.

1 part of this sulfuric acid ester is dissolved in the calculated quantity of dilute caustic soda solution. By evaporating the neutral aqueous solution in a vacuum, the freely water-soluble sodium salt of α-methyl-α'-ethyl-4,4'-dihydroxystilbene sulfuric acid ester is obtained.

The sulfuric acid ester of α,α'-diethyl-4,4'-dihydroxystilbene and its alkali salt can be prepared in similar manner.

*Example 3*

A solution of 1 part of α-ethyl-α'-n-propyl-4,4'-dihydroxystilbene in 5 parts of pyridine is added cautiously and with frequent shaking to a solution cooled to —15° C. of 2 parts of phosphorus hydroxychloride in 5 parts of pyridine. The mixture is allowed to remain for ½ hour in the cooling mixture and then poured into an excess of cold sodium bicarbonate solution. The unaltered parent material and a portion of the pyridine are extracted by means of ether. Addition of cold 2 N-sulfuric acid will now precipitate the primary phosphoric acid ester of the α-ethyl-α'-n-propyl-4,4'-dihydroxystilbene of the formula

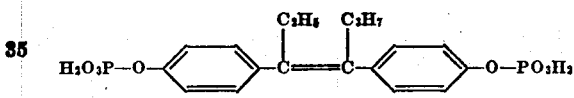

in the form of a white powder.

By neutralization with sodium hydroxide or potassium hydroxide solution there is obtained a solution of the corresponding alkali salt and by evaporation of the solvent this salt remains in the form of a colorless powder.

What we claim is:

1. Process for the manufacture of new esters of the hydroxystilbene series, comprising treating a hydroxy compound of the stilbene series containing at least one hydrocarbon substituent at the ethylene bridge with an inorganic esterifying agent.

2. Process for the manufacture of new esters of the hydroxystilbene series, comprising treating an α,α'-dialkyl-dihydroxystilbene with an inorganic esterifying agent.

3. Process for the manufacture of new esters of the hydroxystilbene series, comprising treating an α,α'-diethyl-4,4'-dihydroxystilbene with an inorganic esterifying agent.

4. Process for the manufacture of new esters of the hydroxystilbene series, comprising treating an α,α'-diethyl-4,4'-dihydroxystilbene with a phosphating agent.

5. Process for the manufacture of new esters of the hydroxystilbene series, comprising treating an α,α'-diethyl-4,4'-dihydroxystilbene with a sulphating agent.

6. Process for the manufacture of new esters of the hydroxystilbene series, comprising treating an α,α'-dialkyl-dihydroxystilbene with an inorganic esterifying agent and then with an agent which is capable of forming an ester salt.

7. Process for the manufacture of new esters of the hydroxystilbene series, comprising treating an α,α'-diethyl-4,4'-dihydroxystilbene with an inorganic esterifying agent and then with an agent which is capable of forming an ester salt.

8. Process for the manufacture of new esters of the hydroxystilbene series, comprising treating an α,α'-diethyl-4,4'-dihydroxystilbene with a phosphating agent and then with an agent which is capable of forming an ester salt.

9. Process for the manufacture of new esters of the hydroxystilbene series, comprising treating an α,α'-diethyl-4,4'-dihydroxystilbene with a sulphating agent and then with an agent which is capable of forming an ester salt.

10. The inorganic esters of hydroxystilbenes which contain at least one hydrocarbon substituent at the ethylene bridge.

11. The inorganic esters of α,α'-dialkyl-dihydroxystilbene.

12. The inorganic esters of α,α'-diethyl-4,4'-dihydroxystilbene.

13. The phosphates of α,α'-diethyl-4,4'-dihydroxystilbene.

KARL MIESCHER.
JULES HEER.